UNITED STATES PATENT OFFICE.

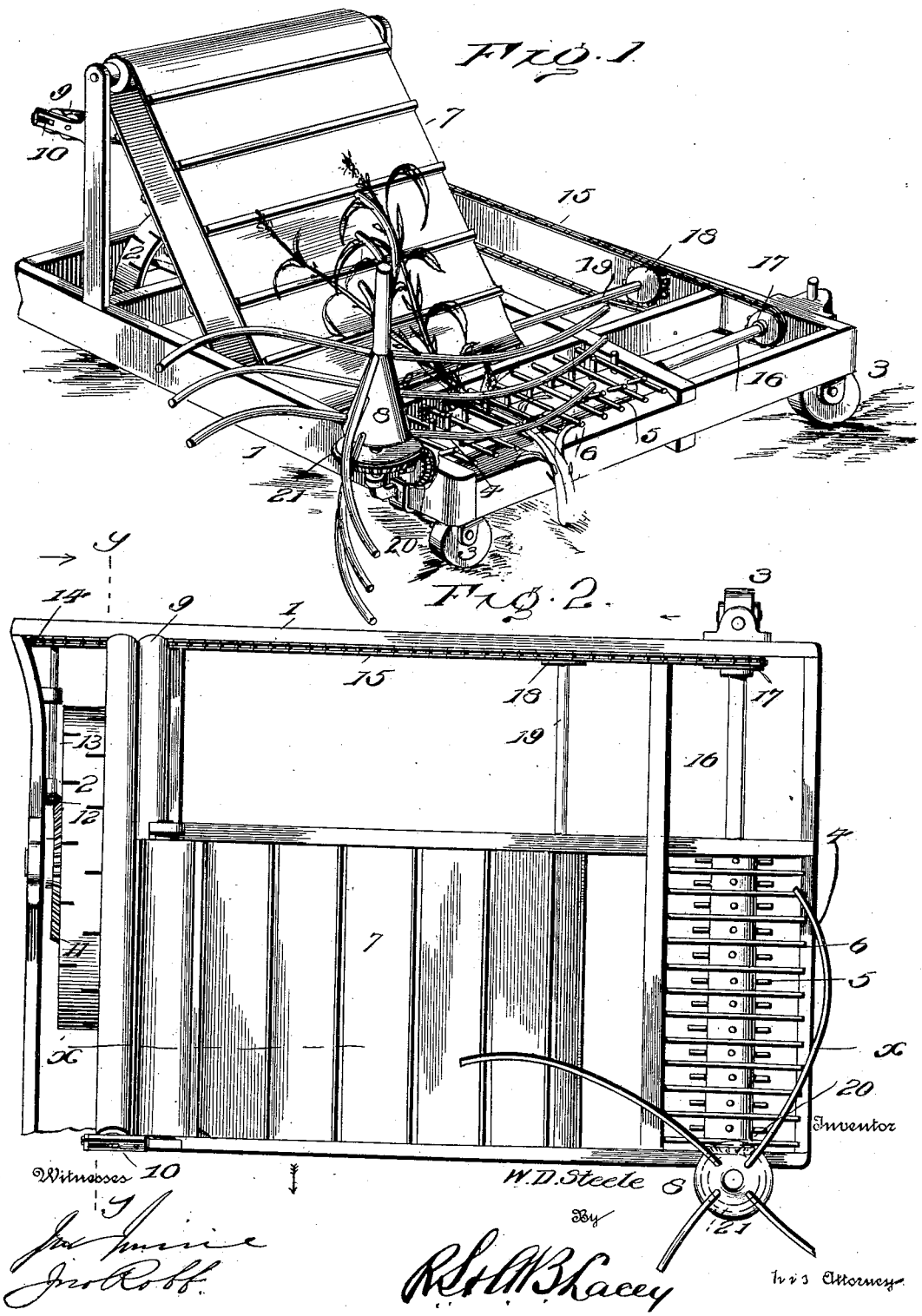

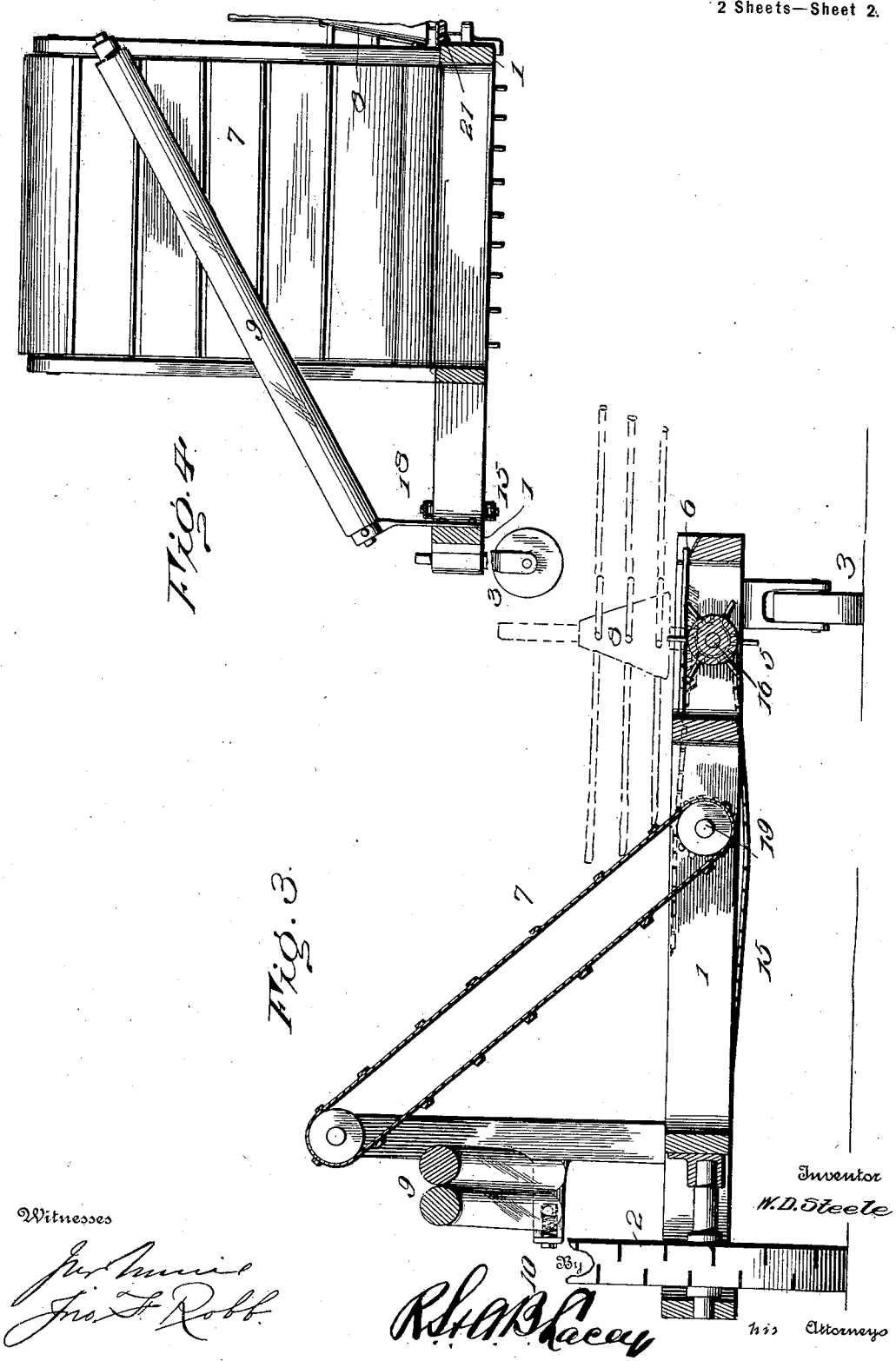

WILLIAM D. STEELE, OF SIDELL, ILLINOIS.

CORN-HARVESTER.

SPECIFICATION forming part of Letters Patent No. 712,976, dated November 4, 1902.

Application filed December 14, 1901. Serial No. 85,975. (No model.)

*To all whom it may concern:*

Be it known that I, WILLIAM D. STEELE, a citizen of the United States, residing at Sidell, in the county of Vermilion and State of Illinois, have invented certain new and useful Improvements in Corn-Harvesters; and I do hereby declare the following to be a full, clear, and exact description of the invention, such as will enable others skilled in the art to which it appertains to make and use the same.

This invention relates to the type of agricultural machines designed to snap ears of corn from the stalks and leave the latter standing in the field to be subsequently gathered for fodder, the ears being stripped of their husks during the harvesting process, thereby reducing the cost of placing the grain upon the market to a minimum amount.

The invention relates more particularly to the means for bending the stalks over the picker-cylinder as the machine is drawn over the field.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a corn-harvesting machine embodying the invention. Fig. 2 is a plan view thereof. Fig. 3 is a section about on the line X X of Fig. 2 looking toward the rear, the dotted lines showing the relative position of the reel. Fig. 4 is a section on the line Y Y of Fig. 2 looking to the right as indicated by the arrow.

Corresponding and like parts are referred to in the following description and indicated in all the views of the drawings by the same reference characters.

The main frame of the implement is indicated at 1 and is mounted upon a ground-wheel 2 and caster 3, the ground-wheel also serving as a driver for imparting movement to the operating mechanisms.

The gathering mechanism is located at one side or end of the machine and comprises a reel 4, picker-cylinder 5, and grate 6, the latter being adapted to receive the upper ends of the stalks which are bent thereover by the arms of the reel, so as to bring the ears in position to be snapped from the stalks by the teeth of the picker-cylinder. The picker-cylinder 5 is located below the grate 6, and its teeth operate between the grate-bars, so as to come in contact with the ears of corn and snap them from the stalks. The picker-cylinder is rotated to cause the teeth to travel inward across the grate, thereby throwing the ears of corn upon the elevator 7, arranged at the inner side of the picker-cylinder and inclining upwardly and toward the opposite side or end of the machine. The reel 4 is driven so as to cause its arm to move across the grate and picker-cylinder and toward the elevator. The arms of the reel are longitudinally curved, so as to prevent slipping of the stalks after coming in contact with the said arms. To prevent the stalks and blades from wrapping about the shaft of the reel, a conical guard 8 is fitted thereto. The husking-rolls 9 are located at the delivery end of the elevator 7 in such a position as to receive the ears of corn falling therefrom, and these rolls incline in the usual way to cause the ears of corn to move thereon by gravitative force. The rolls are adapted to yield to accommodate themselves to the bulk of husks passing therebetween, the yielding bearing being indicated at 10.

The operating parts—such as the picker-cylinder 5, reel 4, elevator 7, and husking-rolls 9—may be driven from the ground-wheel 2 by means of any suitable gearing, and, as shown, the drive-wheel 2 is provided at one side with bevel-gearing 11, in mesh with a bevel-pinion 12, secured to one end of a shaft 13, having a pulley 14 around which passes a drive-belt 15 for transmitting motion to the shaft 16 of the picker-cylinder 5 by passing around a pulley 17 secured therein. A pulley 18, secured to the shaft 19 of the roll receiving the lower end of the elevator-belt 7, is driven by contact with a portion of the drive-belt 15, and the reel 4 is driven by means of a bevel-pinion 20 on the shaft 16 and a bevel gear-wheel 21, secured to the lower portion of the reel-shaft.

In operation as the machine is drawn over the field parallel with and to one side of a row of corn the arms of the reel 4 come in contact with the stalks and bend them over the grate 6, as indicated in Fig. 1, and the ears are snapped therefrom by the teeth of the picker-cylinder and are thrown upon the elevator 7 and are carried upward thereby and delivered upon the husking-rolls, which strip the ears and deliver them into a suitable receptacle (not shown) attached to and forming a part of the machine.

Having thus described the invention, what is claimed as new is—

1. In a corn-harvester, a picker-cylinder arranged horizontally in the line of motion of said machine, a grate placed over the said cylinder, and a vertical reel located at one end of the picker-cylinder and having its arms arranged to sweep over the grate, substantially as described.

2. In a corn-harvester, a horizontal picker-cylinder arranged parallel with the line of motion of the machine, a vertical reel at the front end of the picker-cylinder and geared thereto and having its arms arranged to sweep rearward and inward, and a conical guard surrounding the lower portion of the reel-shaft to prevent the stalks wrapping therearound, substantially as described.

In testimony whereof I affix my signature in presence of two witnesses.

WILLIAM D. STEELE. [L. S.]

Witnesses:
WM. G. CATHCART,
MAX HOLTON.